(12) United States Patent
Kukushkin et al.

(10) Patent No.: US 8,159,667 B2
(45) Date of Patent: Apr. 17, 2012

(54) TERA- AND GIGAHERTZ SOLID STATE MINIATURE SPECTROMETER

(75) Inventors: Igor Kukushkin, Moscow District (RU); Viacheslav Muravev, Noginsk (RU)

(73) Assignee: Terasense Group, Inc., Torrance, CA (US)

( * ) Notice: Subject to any disclaimer, the term of this patent is extended or adjusted under 35 U.S.C. 154(b) by 315 days.

(21) Appl. No.: 12/635,652

(22) Filed: Dec. 10, 2009

(65) Prior Publication Data

US 2011/0141468 A1 Jun. 16, 2011

(51) Int. Cl.
*G01J 3/28* (2006.01)
(52) U.S. Cl. .................. 356/326; 250/336.1; 257/15
(58) Field of Classification Search .............. 356/326; 250/336.1; 257/15
See application file for complete search history.

(56) References Cited

U.S. PATENT DOCUMENTS

| | | | |
|---|---|---|---|
| 5,625,729 A | 4/1997 | Brown | |
| 2004/0201076 A1 | 10/2004 | Shur et al. | |
| 2005/0099345 A1 | 5/2005 | Von Klitzing | |
| 2006/0289761 A1 | 12/2006 | Nabet | |

OTHER PUBLICATIONS

T. Otsuji et al, A grating-bicoupled plasmon-resonant teerahertz emitter fabricated with GaAs-based heterostructure metamaterial systems, 2005, Optical Society of America.*
Hideki Hasegawa et al, Sensing Terahertz Signals with III-V Quantum Nanostructures, 2003, SPIE, vol. 4999.*
I.V. Kukushkin et al, Spectrum of one-dimensional plasmons in a single stripe of two-dimensional electrons, 2005, The American Physical Society, Physical Review B 72, 161317(R).*
Form PCT/ISA/210 in connection with PCT/US2010/059510 dated Aug. 30, 2011.
Form PCT/ISA/237 in connection with PCT/US2010/059510 dated Aug. 30, 2011.

* cited by examiner

*Primary Examiner* — Layla Lauchman
(74) *Attorney, Agent, or Firm* — Greenberg Traurig LLP; Allan Z. Litovsky (57) ABSTRACT

A high speed miniature tera- and gigahertz electromagnetic radiation on-chip spectrometer that comprises a tunable solid state 2D charge carrier layer or a quasi 2D charge carrier layer with incorporated single or multiple defects, at least first and second contacts to the charge carrier layer. Also the device includes an apparatus for measuring the device response between the first and second contacts, and an apparatus for a controllable tuning of at least one of the charge carrier layer parameters. The operation principle is based on the fact that radiation of different wavelengths excites distinct sets of plasma modes in the charge carrier layer.

38 Claims, 11 Drawing Sheets

TERA- AND GIGAHERTZ SOLID STATE MINIATURE SPECTROMETER

BACKGROUND

The region of electromagnetic spectrum lying in the giga (GHz)-terahertz (THz) frequency range has recently become of increasing interest in the various fields of science and technology. In part, such interest is caused by unique properties of GHz-THz radiation, which make such radiation appealing for a great number of useful applications. Terahertz radiation is non-ionizing, and thus, unlike X-rays, it is not harmful for biological tissues and DNA. In addition, most biological and chemical agents have resonant absorption lines in the THz region. Therefore, accurate and safe tomography of different human and other biological tissues may be enabled. Because terahertz radiation can penetrate fabrics and plastics, it can be used in security applications, e.g., to screen for concealed weapons. The high-frequency nature of the THz radiation makes it possible to utilize it in higher frequency computer and high-altitude telecommunication systems. Likewise, terahertz sensing and imaging may be used in many applications in the field of manufacturing, quality control and process monitoring. These applications generally take advantage of the properties of plastics, cardboard and other packaging materials being transparent to terahertz radiation, and thereby making it possible to inspect packaged products. Similarly, THz radiation affords additional tools of scientific research in a variety of fields, from submillimeter and millimeter astronomy investigations to solid state research.

SUMMARY

The following is a summary description of illustrative embodiments of the invention. It is provided as a preface to assist those skilled in the art to more rapidly understand the detailed design discussion, but it is not intended in to limit any way the scope of the claims, which are appended hereto in order to particularly point out the instant invention.

The present invention builds upon the technology and invention described and claimed in U.S. patent application Ser. No. 12/247,096, which is incorporated herein by reference. The embodiments disclosed hereafter utilize the present invention, which provides a new fast, miniature electromagnetic radiation spectrometer based on resonant excitation of plasmons in solid-state systems that contain tunable charge carrier layers with at least one incorporated defect. Depending on the size of the cavity, where the resonant plasmon excitation takes place, the operation frequency of the device may span the range from approximately 1 GHz to approximately 10 THz. The tunability of the charge carrier layer can be achieved by controllable sweeping of at least one of the following layer parameters: carrier density, the dielectric environment, the applied magnetic field, the effective carrier mass, and the size of the plasmonic cavity. The device can comprise one or more tunable solid state systems, each of which includes at least one charge carrier layer (electron or hole) with al least one intentionally incorporated defect and at least two potential contacts electrically connected to said layer or layers.

To achieve said tunability, the apparatus has to also include a means for a controllable tuning of the one or more of the above listed charge carrier layer parameters. A "defect" may comprise any inhomogeneity introduced into the two-dimensional charge layer (which is described in detail in U.S. patent application Ser. No. 12/247,096). The spectrum of the incident radiation can be calculated via an analysis of the device response to an adjustment of a tunable parameter. Frequency sensitive real-time matrix cameras can be implemented on the basis of the disclosed basic spectrometer element because of its small size (normally on the order of a few micrometers) and a complete absence of any moving parts or components.

Operation of the embodiments described herein may rely on the following principles:

1. Incident radiation is coupled to potential probes and/or to a charge carrier layer and/or to the antenna structure, thereby inducing on them an alternating potential.
2. The alternating potential induces plasma waves, which propagate and resonate in the tunable plasmonic cavity. The cavity stands for the region on the crystal restricted by the boundaries, on which boundaries the plasmon dispersion undergoes a step. The cavity can be tuned by a continuous controllable adjustment (i.e. sweeping) of at least one of its parameters (e.g., the carrier density).
3. The oscillating plasmon electric field inside the device is rectified by the non-linear characteristic of the device, resulting in a DC response between different pairs of the potential probes. The non-linear device behavior is caused by the presence of at least one defect (as described in detail in U.S. patent application Ser. No. 12/247,096).
4. Detection of the device response/signal as a function of the tuned parameter(s) yields sufficient data to calculate the spectrum of the incident radiation.

DESCRIPTION OF DRAWINGS

FIG. 17 (top part) shows experimentally measured dependency of the radiation induced photovoltage, as a function of magnetic field magnitude;

DETAILED DESCRIPTION

Collective plasma excitations in low-dimensional charge carrier layers have attracted interest of the researchers and engineers for decades. On the one hand, the interest has been caused by a plethora of plasma-wave effects, which are interesting from the scientific point of view. It has been established that by properly designing the geometry and the parameters of a plasmonic cavity, it is possible to achieve the plasma frequency of the cavity in a specific terahertsz region. The basic characteristics of a plasmon are the frequency and the wave vector. They are related to each other by the dispersion relation. Plasma waves in the two-dimensional charge carrier layer possess a dispersion of the following form:

$$\omega_p^2(q) = \frac{n_s e^2}{2m^* \varepsilon_0 \varepsilon(q)} q \quad (1)$$

Here, $n_S$ and $m^*$ are the density and the effective mass of the two-dimensional electrons/holes, respectively, while $\in_0$ and $\in(q)$ are the permittivity of vacuum and the effective permittivity of the surrounding medium, respectively, and $\omega_p$ denotes the frequency of the plasma wave. The dispersion is strongly influenced by the effective electric permittivity, which is a complex function of the plasmon wave vector q. In the device embodiments suggested herein, propagation of each plasmon is restricted to a certain part of the charge carrier layer—plasmonic cavity. This plasmonic cavity is defined by the geometric boundaries, within which the plasmon dispersion undergoes a step. If the geometric cavity size amounts to L, then, due to interference of plasma waves backscattered from the cavity borders, only plasmons with wave vectors q=nπ/L (n=1, 2, 3 . . . ) are excited. If the radiation frequency is fixed and one of the charge carrier layer parameters, e.g., electron/hole density $n_S$, is swept, then the consecutive plasma resonances with wave numbers n=1, 2, 3 . . . result in the cavity. The resulting resonances can be used to generate a device response, e.g. photovoltage, photocurrent, photocapacitance, photoinductance or photoresistance signal, as described in U.S. patent application Ser. No. 12/247,096. The signal, as a function of the electron/hole densities, is characterized by a series of corresponding maximums. Such maximums are achieved when the parameters (e.g., electron or hole densities) are in specific ranges. The measured resonant response function is defined by the frequency of the incident radiation and can be determined based on the above equation (1). The shape of the resulting resonant function allows to calculate the frequency or the spectrum of the incident radiation.

Figure 11:
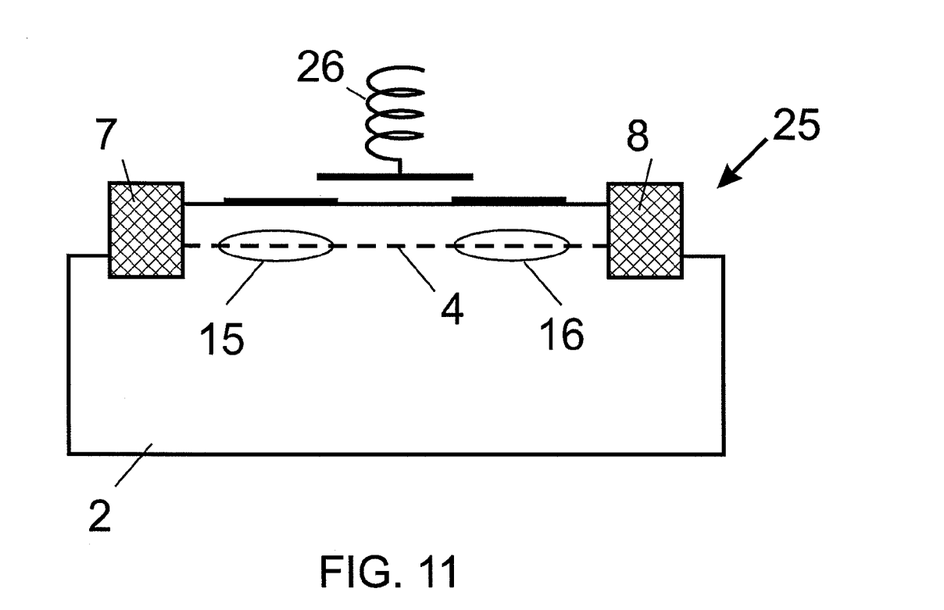
FIG. 11 is a side schematic view of an alternate embodiment where tunability of the plasmonic cavity is implemented by sweeping its dielectric environment.

A spectroscopic analysis of incident giga-terahertz radiation has been conducted for a number of device embodiments. The spectrum of the incident radiation is obtained by tuning one of the parameters, which influence the plasmon dispersion or localization. For the first device family schematically depicted in the FIGS. 1-10, the parameter that is being tuned is the charge density in the plasmonic cavity. For other embodiments shown in the FIGS. 11-13, the parameter being tuned is either magnetic field, dielectric environment, size of the plasmonic cavity. For simplicity, in the following discussions one layer two-dimensional charge carrier system is used. However it is to be understood that the same principles and results also apply to other types of charge carrier layers specified in claims.

Figure 1:
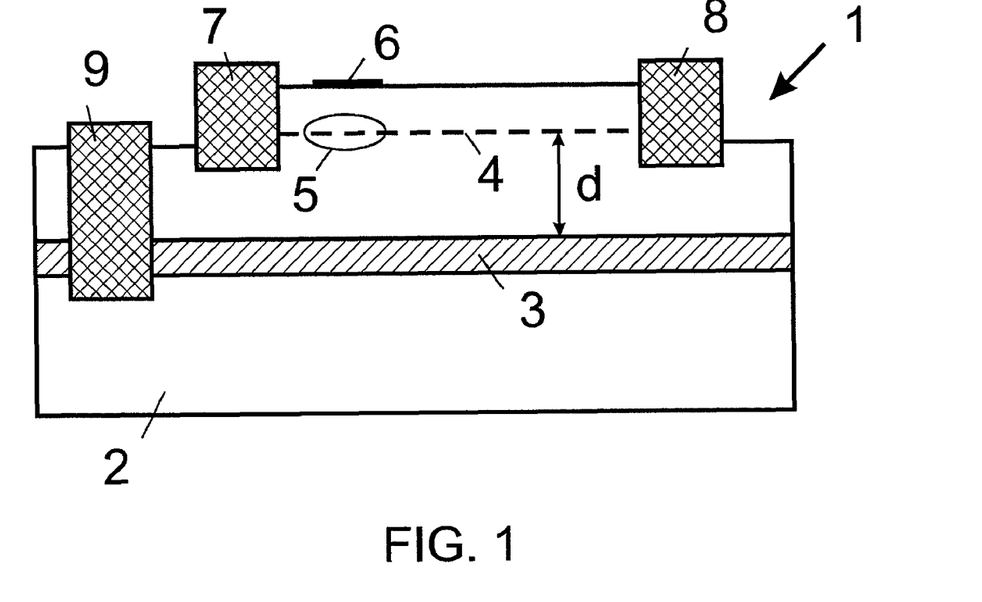
FIG. 1 is a side schematic view of an alternate embodiment where the plasmonic cavity is tuned by a back gate.
Figure 2:
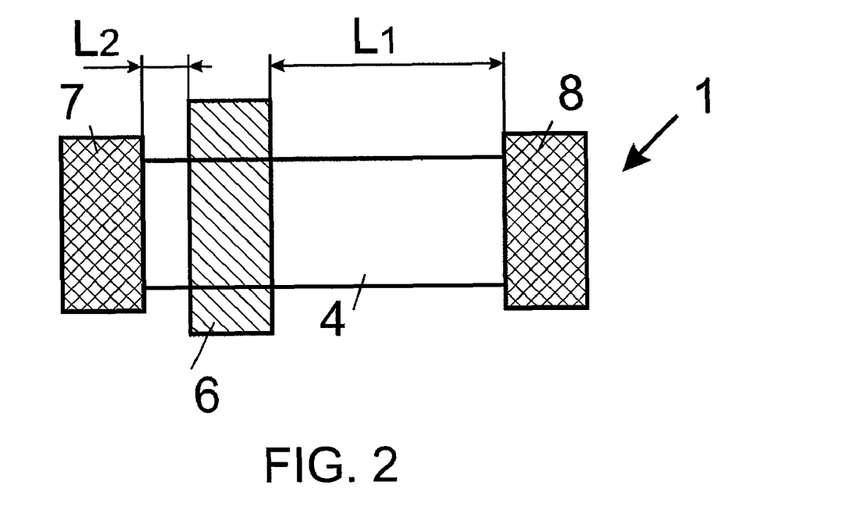
FIG. 2 is a top schematic view of the device of FIG. 1.

Turning to the drawings, FIGS. 1-2 show a solid state device 1 according to one embodiment of the instant invention. Device 1 includes a structure 2 with embedded back gate 3, and a two-dimensional charge carrier layer 4. The device charge carrier layer 4 includes a defect structure 5. A defect and/or defects may be any inhomogeneity in a two-dimensional charge carrier layer and/or in its environment. For example, such a defect in the environment can be introduced by creating a step in the solid state crystal cap layer. In general, defects can be made or introduced using any approach now known or later developed. Another example of a defect can be realized in one or more of the following forms: an etched area, a charge carrier density inhomogeneity, a restriction or expansion, metallic layer (e.g., deposited on the structure), an impurity doping, a charge carrier mobility defect, a dielectric environment defect, a structural defect, etc. The device embodiment illustrated in FIGS. 1-2 contains a defect structure 5 (charge carrier density inhomogeneity), which is created by gate 6 deposited on the top of the semiconductor crystal or any other suitable solid state device. By applying voltage to gate 6, the region of the two-dimensional system under gate 6 can be depleted or enriched, which adds a density inhomogeneity to the two-dimensional charge carrier layer 4 and forms the defect. The device 1 terminates at each end with contacts 7 and 8. Contact 9 is connected to back gate 3. Back gate 3 is intended to sweep the carrier density in the charge carrier layer via field effect.

FIG. 2 shows that defect 5 and contacts 7 and 8 confine the regions of the two-dimensional system of lengths $L_1$ and $L_2$. Under incident radiation, these regions act as resonant plasmonic cavities tuned by the back gate potential. The known function of the device response to the tuned carrier density allows to calculate the radiation spectrum.

Figure 3:
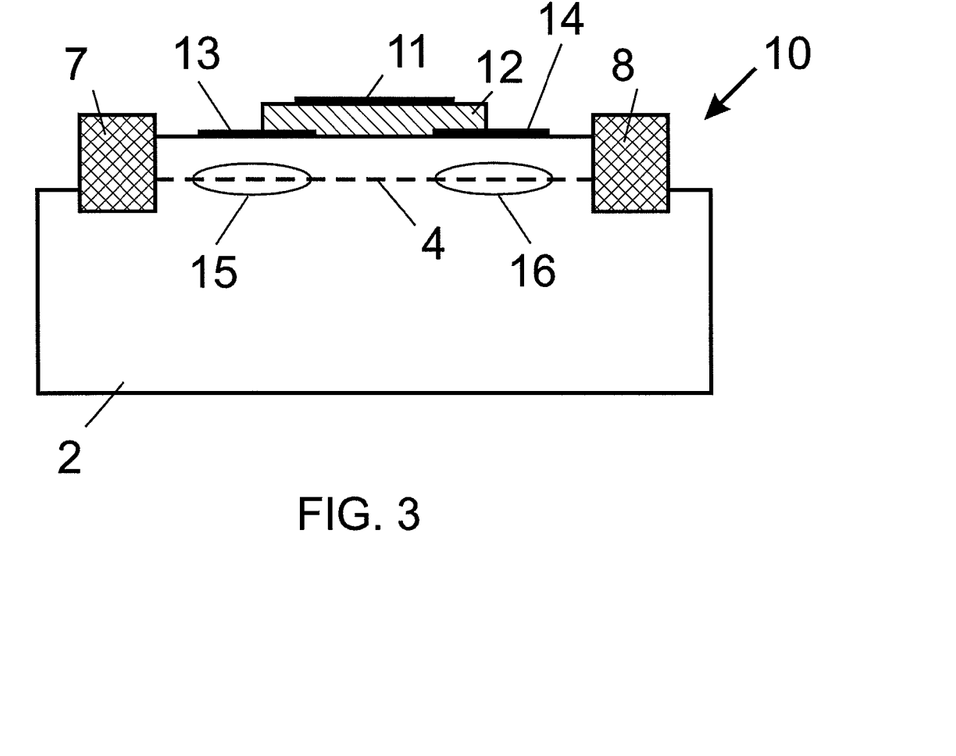
FIG. 3 is a side schematic view of an alternate embodiment where the plasmonic cavity is tuned by a top gate placed on a dielectric layer.
Figure 4:
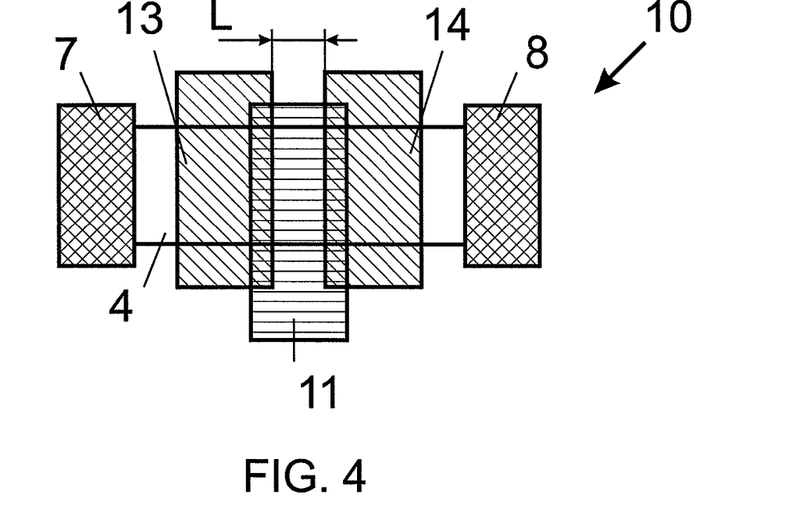
FIG. 4 is a top schematic view of the device of FIG. 3.

Additionally, device 1 may include one or more charge carrier layers and/or contacts not shown in FIGS. 1 and 2. Further, the tunability of the plasmonic cavity by back gate 3 is only illustrative of various configurations for tuning the charge density in the cavity. To that extent, FIGS. 3 and 4 show an alternative semiconductor device 10 according to another embodiment of the invention. In this embodiment, carrier density in the plasmonic cavity is tuned by top gate 11. Top 11 gate is located on dielectric layer 12, which isolates gate 11 from two low-lying gates 13 and 14. These gates serve as boundaries for the plasmonic cavity of length L. By applying a voltage to gates 13 and 14, the region of the two-dimensional system under the gates could be depleted or enriched, which adds inhomogeneity to the two-dimensional layer 4 and forms defects 15 and 16.

Figure 5:
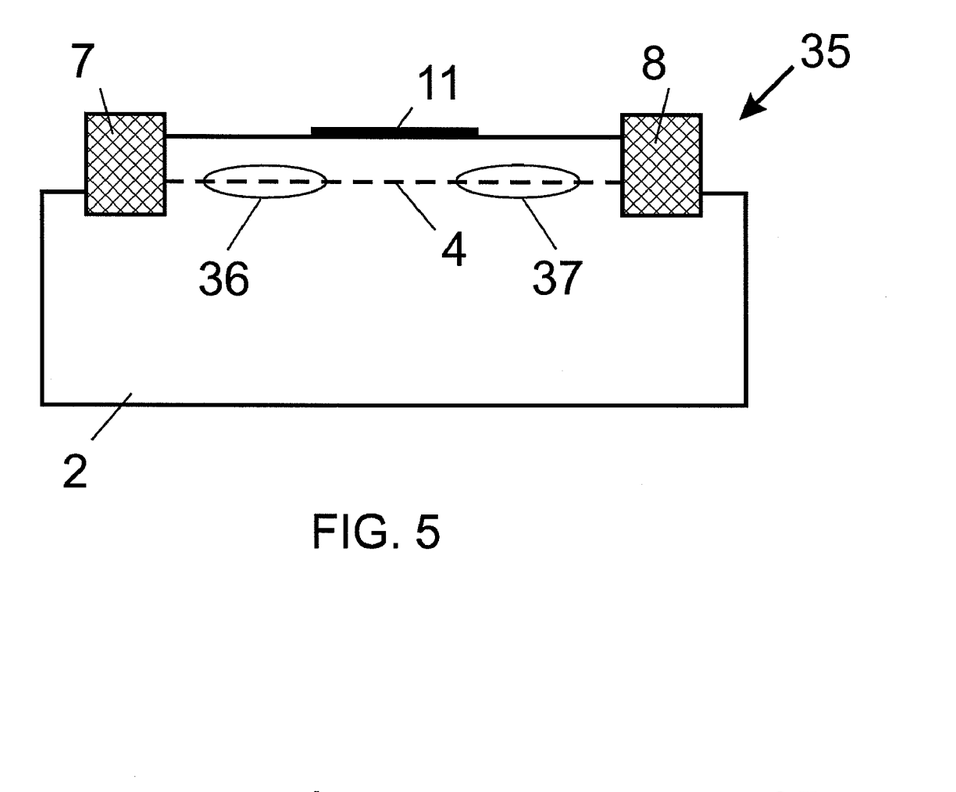
FIG. 5 is a side schematic view of an alternate embodiment where the plasmonic cavity is tuned by a gate placed directly on top of the structure.
Figure 6:
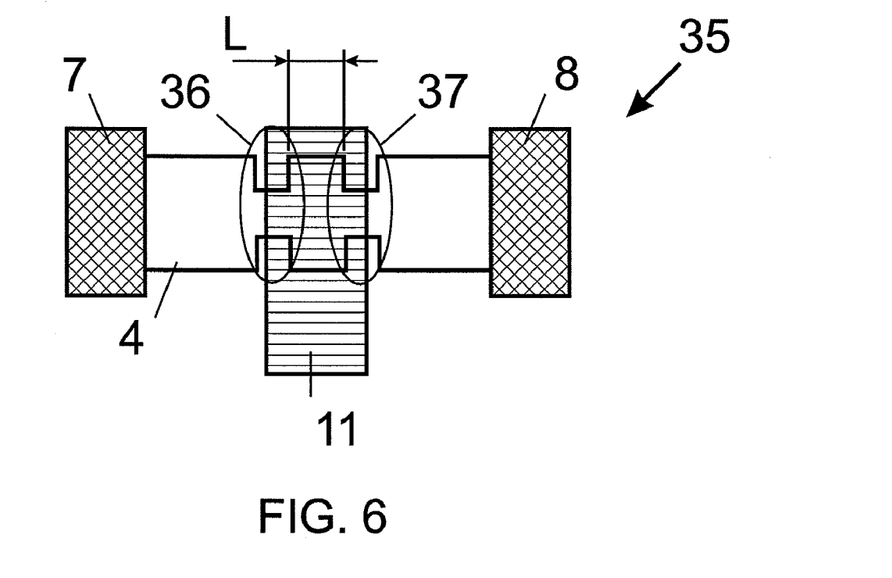
FIG. 6 is a top schematic view of the device of FIG. 5.

For certain defect types, dielectric layer 12 is not necessary. For example FIGS. 5 and 6 illustrate such a case. In this embodiment 35 the gate 11, which sweep carrier density in the plasmonic cavity is located directly on top of the structure 2. The defects 36 and 37 can be implemented as two restrictions. They serve both as boundaries to the plasmonic cavity of length L and take part in the rectification process.

Figure 7:
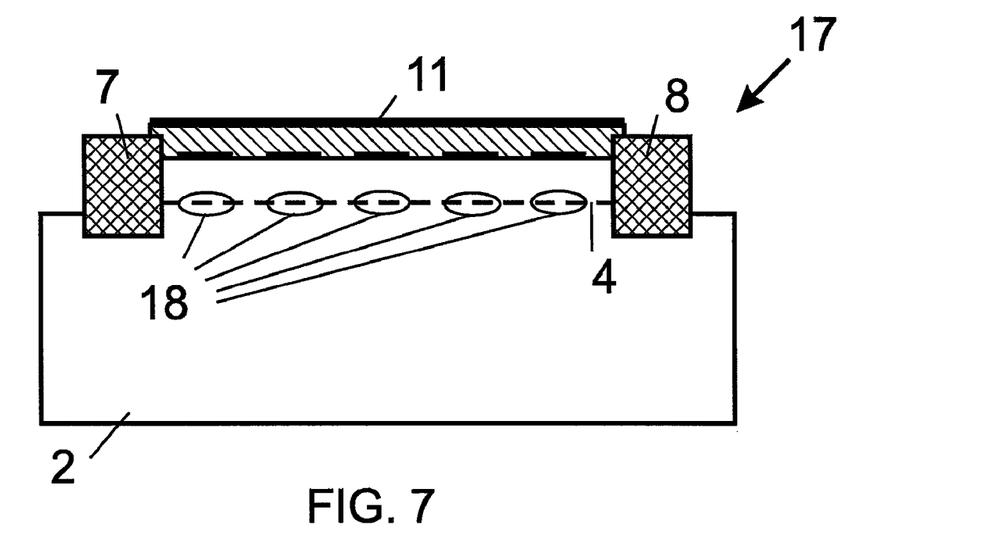
FIG. 7 is a side schematic view of an alternate embodiment where a series of plasmonic cavities of arbitrary shape is tuned.
Figure 8:
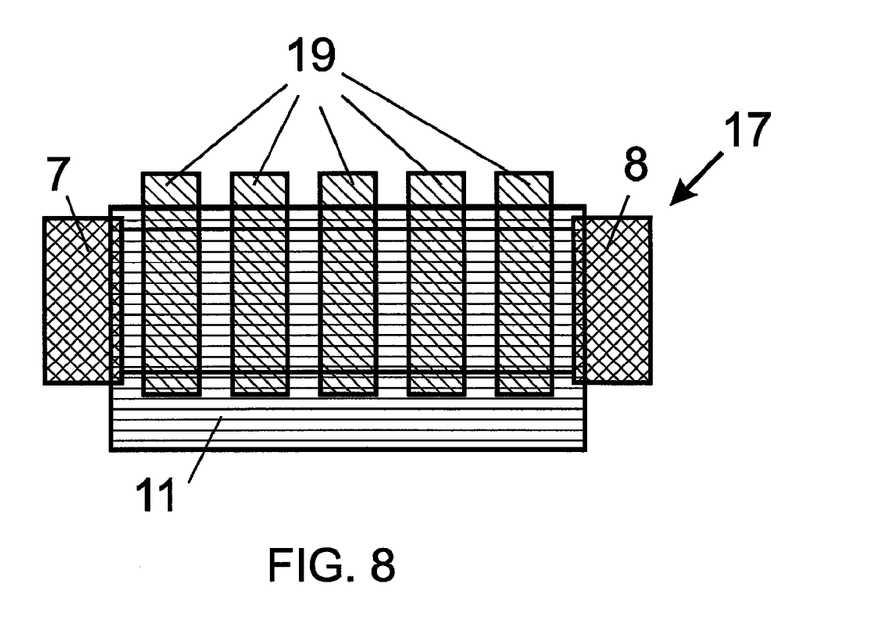
FIG. 8 is a top schematic view of the device of FIG. 7.
Figure 9:
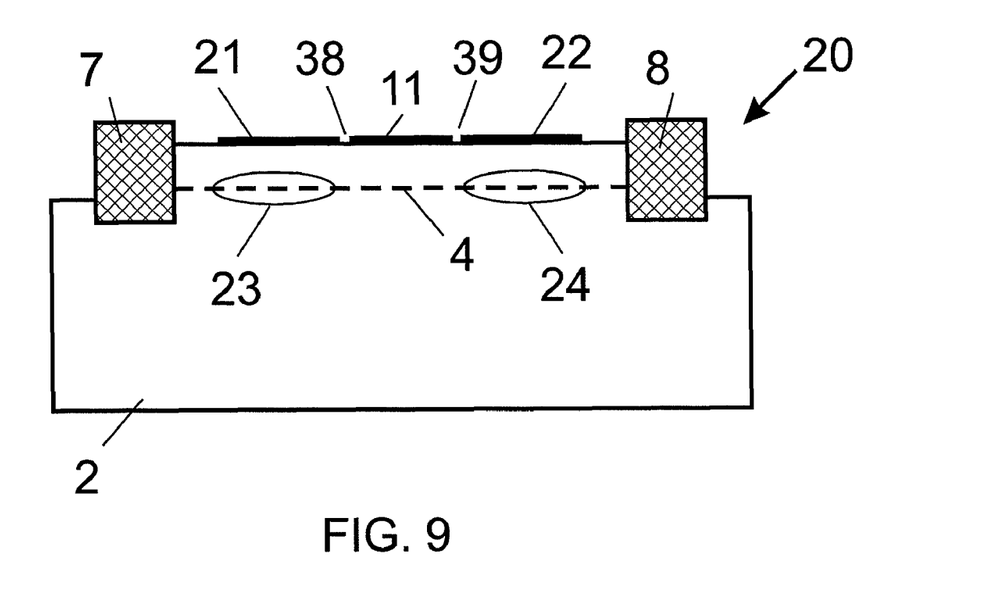
FIG. 9 is a side schematic view of an alternate embodiment where rectifying defects are placed away from the plasmonic cavity.
Figure 10:
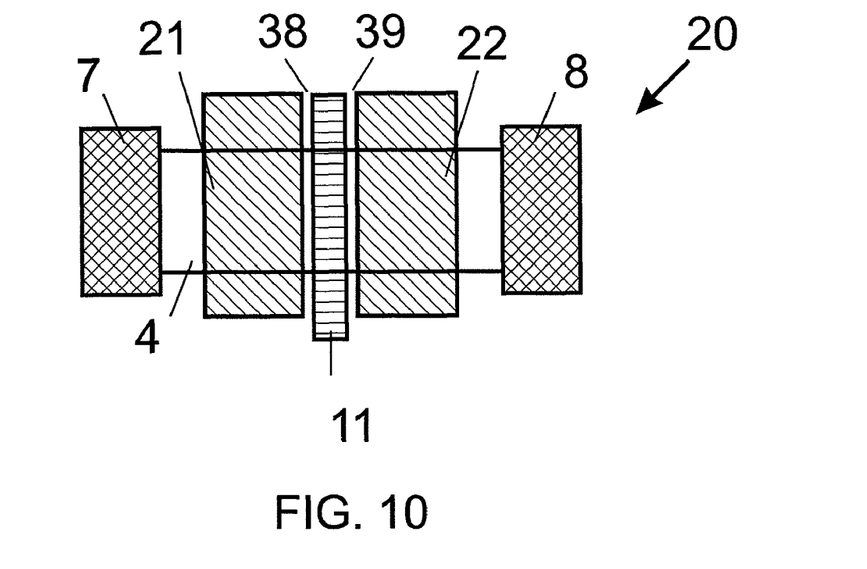
FIG. 10 is a top schematic view of the device of FIG. 9.

Referring to FIGS. 1 through 6, it is understood that while device 1 is shown as having one defect 5 and devices 10 and 35 are shown as having two defects 15 and 16 (36 and 37), any number of defects and plasmonic cavities of different kinds may be used in any device embodiment. For example, FIGS. 7 and 8 show device embodiment 17 having multiple gate defects 18 (formed by gates under voltage 19) placed at arbitrary positions along the two-dimensional charge carrier layer 4. Gates 19 restrict a series of plasmonic cavities. It is understood that various defects 18 and gates 19 could be independently interconnected by metallization, by the two-dimensional charge wires or by any other method now known or later developed. These interconnections are not shown in the drawings to avoid confusion. In addition, although not shown, embodiments of the device in accordance with the instant invention may comprise arrays of elementary interconnected devices.

In the device embodiments 1, 10, 35 and 17 the defects play a dual role. They form a plasmonic cavity, and they also rectify the oscillating plasmon electric field. At the same time, the rectifying defects may be placed away from the plasmonic cavity as it shown in FIG. 9-10. Device 20 (FIG. 9-10) comprises a cavity, which is formed by tuning gate 11 and two density inhomogeneity defects 23 and 24, which are separated from the cavity by small slits 38 and 39. The density inhomogeneity defects 23 and 24 are produced by two gates 21 and 22. This embodiment is particularly important for the device realization based on MOSFET structures.

Figure 12:
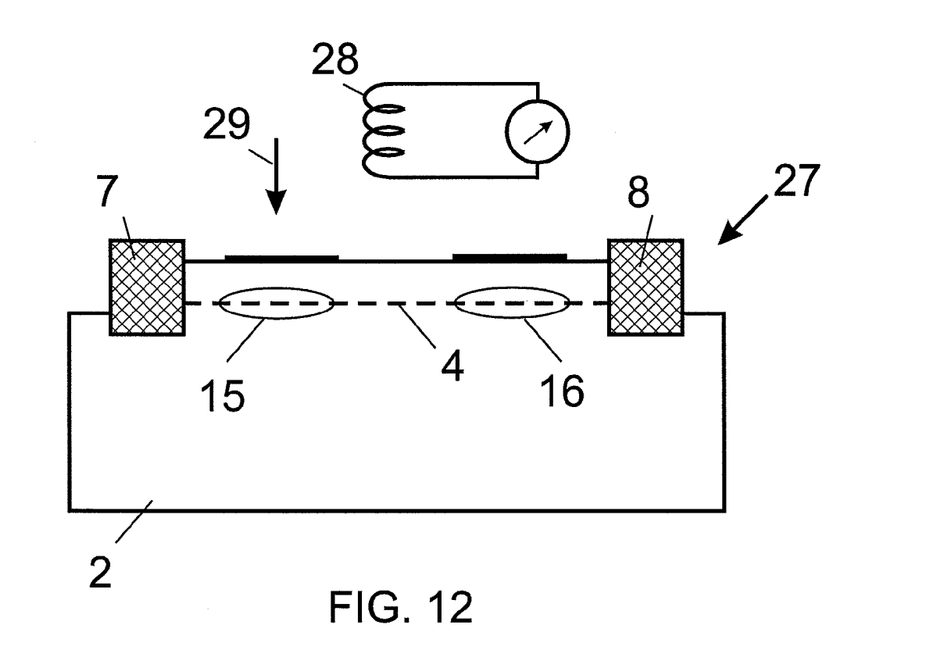
FIG. 12 is a side schematic view of an alternate embodiment where tunability of the plasmonic cavity is implemented by sweeping magnetic field.
Figure 13:
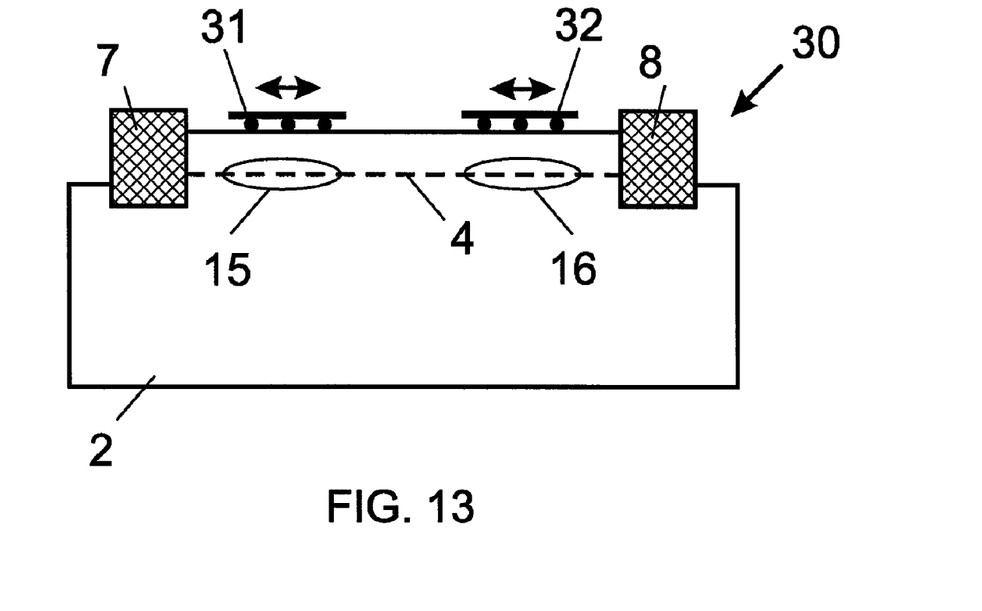
FIG. 13 is a side schematic view of an alternate embodiment where tunability of the plasmonic cavity is accomplished by adjusting the size of the cavity.

As discussed above, the tunability of a plasmonic cavity can be implemented in a number of ways. In device 25 (FIG. 11) the dielectric environment of the plasmonic cavity is swept, for example, by means of a conducting microcantilever 26. This cantilever serves as a floating gate with a controllable distance from the 2D charge layer. In arrangement 27 (FIG. 12), the tunable parameter is the magnitude of the magnetic field. Also shown in FIG. 12 is an independent source 28 for generating (by well-known methods) a magnetic field of a given magnitude, for example, in the direction of arrow 29, or has at least a field component extending in the direction of arrow 29. The tunability of the plasmonic cavity can also be accomplished by adjusting the size of the cavity. For example, device 30 (FIG. 13) can have moving gates 31 and 32, which change the size of the cavity.

Figure 14:
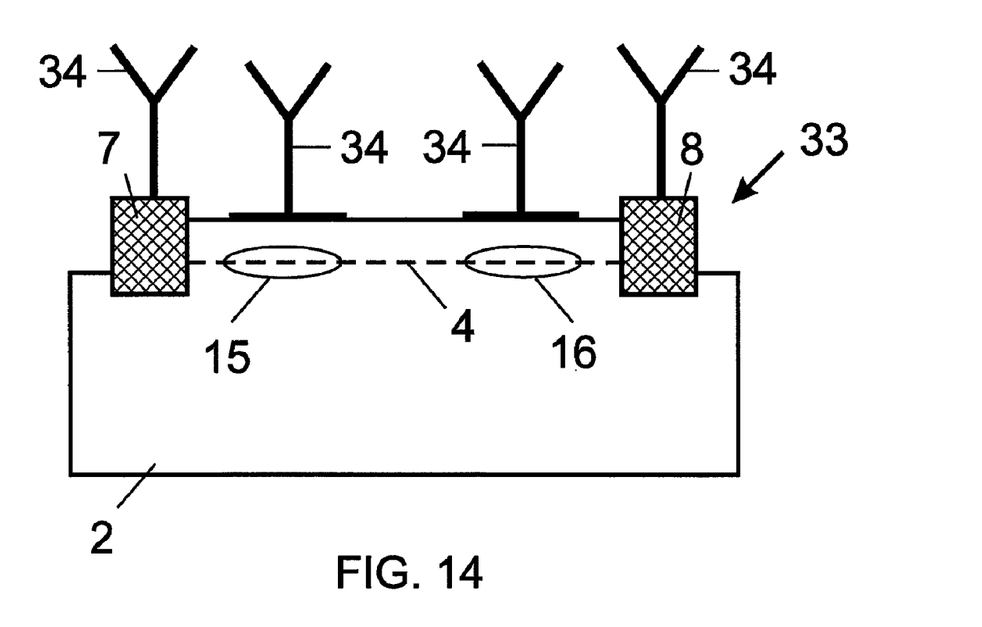
FIG. 14 is a side schematic view of an alternate embodiment with antennas to efficiently couple incident radiation to plasmons.

To couple the incident tera-gigahertz radiation to the plasma excitations, which propagate in the device, a system of antennas can be used. An example of such device with antennas 34 is shown in FIG. 14

Although all the embodiments described above comprise a two-dimensional charge carrier layer of a rectangular shape, many other shapes can be chosen and optimized. Also any number of contacts of arbitrary shape to charge carrier layer can be used.

The device response (e.g. photovoltage, photocurrent, photocapacitance, photoinductance), induced by the incident giga-terahertz radiation has been experimentally observed in a number of device embodiments. Most experiments have been performed with the use of an 18-nanometer wide GaAs/AlGaAs quantum well, which was located 135 nm underneath the crystal surface. The first embodiment, which was experimentally studied by the inventors, is the same as device 1 and is further depicted in the inset of FIG. 15. The electron density in the device was tuned from $0.5 \times 10^{11}$ cm$^{-2}$ to $4.5 \times 10^{11}$ cm$^{-2}$ by applying voltage to the back gate. An n$^+$ GaAs back gate was grown in-situ at a distance of d=765 nm below the quantum well. The two-dimensional electron layer, which is part of the device, has a shape of a stripe with the following geometrical dimensions: the stripe width W=50 µm and the length of the active plasmonic cavity L=400 µm. The sample was placed either in an oversized 16×8 mm waveguide or in an optical cryostat behind the window. In the case of the cryostat, terahertz radiation was focused at the sample by means of quasi-optical reflectors and lenses. A set of backward wave oscillators operating in the frequency range of 10 GHz to 1 THz and with a typical output power from 10 to 0.1 mW was used to illuminate the device with continuous wave radiation.

Figure 15:
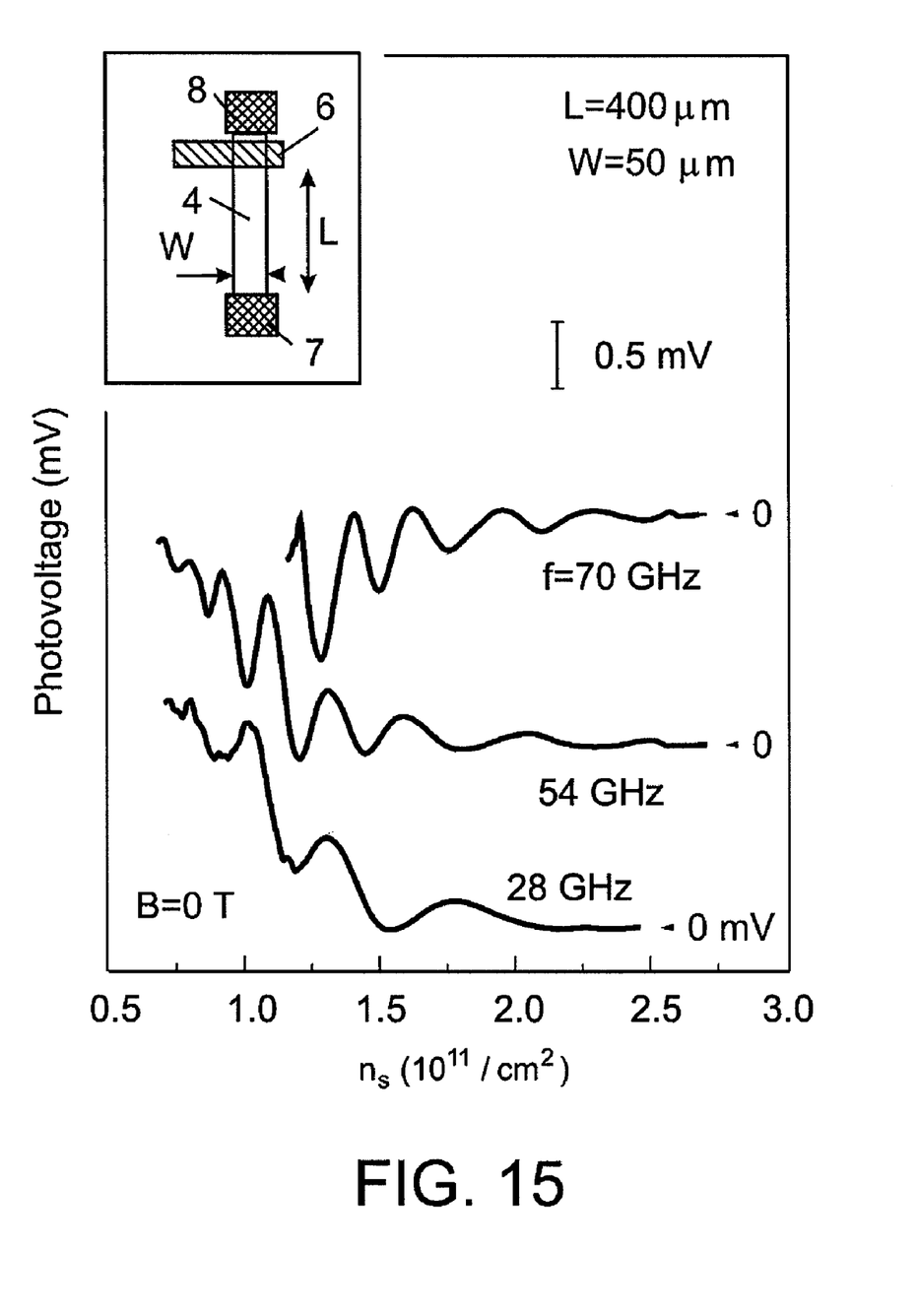
FIG. 15 shows experimentally measured dependencies of the radiation induced photovoltage, as a function of electron density, and for different radiation frequencies. The size of the plasmonic cavity L=400 µm.

FIG. 15 depicts typical functions of the photovoltage device response as a function of the electron density for three different frequencies. The photovoltage is measured between contacts 7 and 8. The traces have been offset vertically for clarity and the arrows indicate the zero signal level when no radiation is incident on the sample. In each trace, a series of oscillations is observed. The maxima originate from the constructive interference of plasma waves with wave vectors $q=n\pi/L$ (n=1, 2, 3 ...) in the active plasmonic cavity formed between contact 7 and gated region 6 of the two-dimensional electron layer. The photovoltage oscillations in FIG. 15 change with the frequency of the incident radiation. Hence, the device may serve as a "spectrometer-on-a-chip". The frequency of radiation can be easily calculated from the density positions of the maxima, provided the plasmon spectrum is known.

Figure 16:
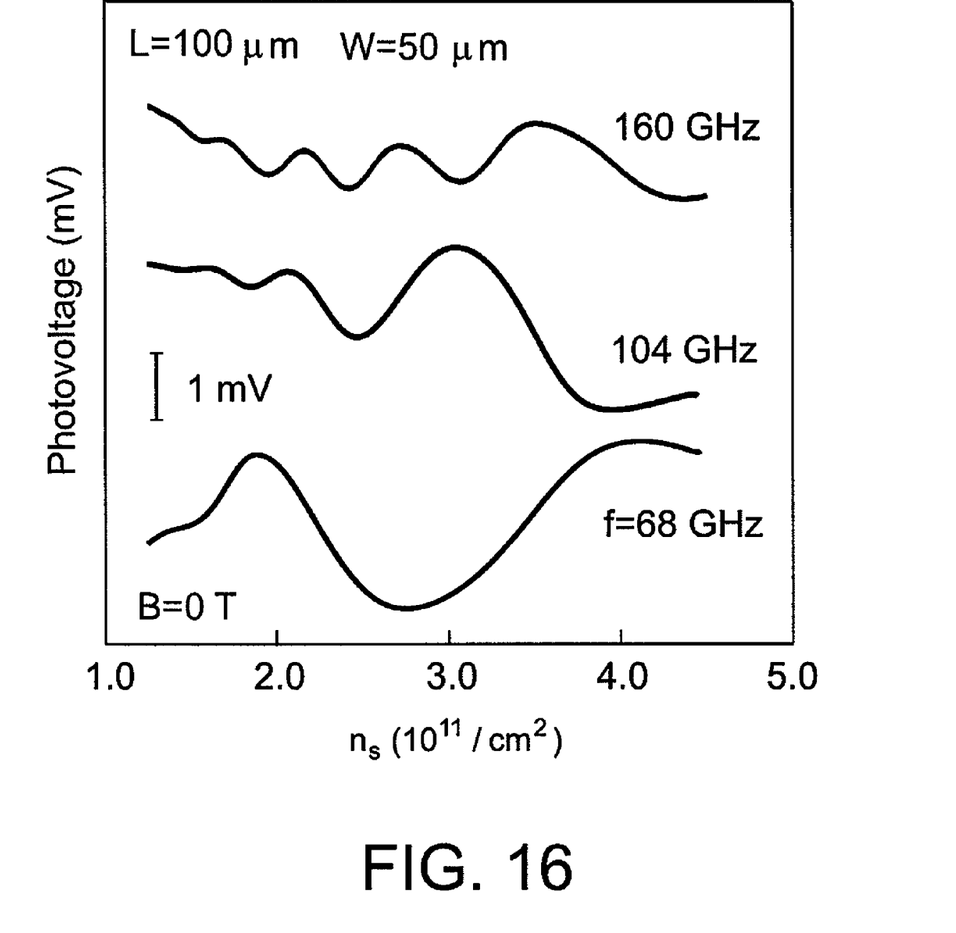
FIG. 16 shows experimentally measured dependencies of the radiation induced photovoltage, as a function of electron density, and for different radiation frequencies. The size of the plasmonic cavity L=100 μm.

FIG. 16 demonstrates the same device 1 embodiment operation, but with another geometrical dimensions: the stripe width W=50 µm an and the length of the active plasmonic cavity L=100 µm. First, it is apparent from FIG. 16 that plasmonic cavities with different sizes cover different frequency ranges. Second, the higher device operation frequency, the smaller the plasmonic cavity which is needed. This relationship between the operation frequency and the size of the cavity is mainly caused by the fact that the plasmon coherence length degrades strongly as the frequency increases.

Figure 17:
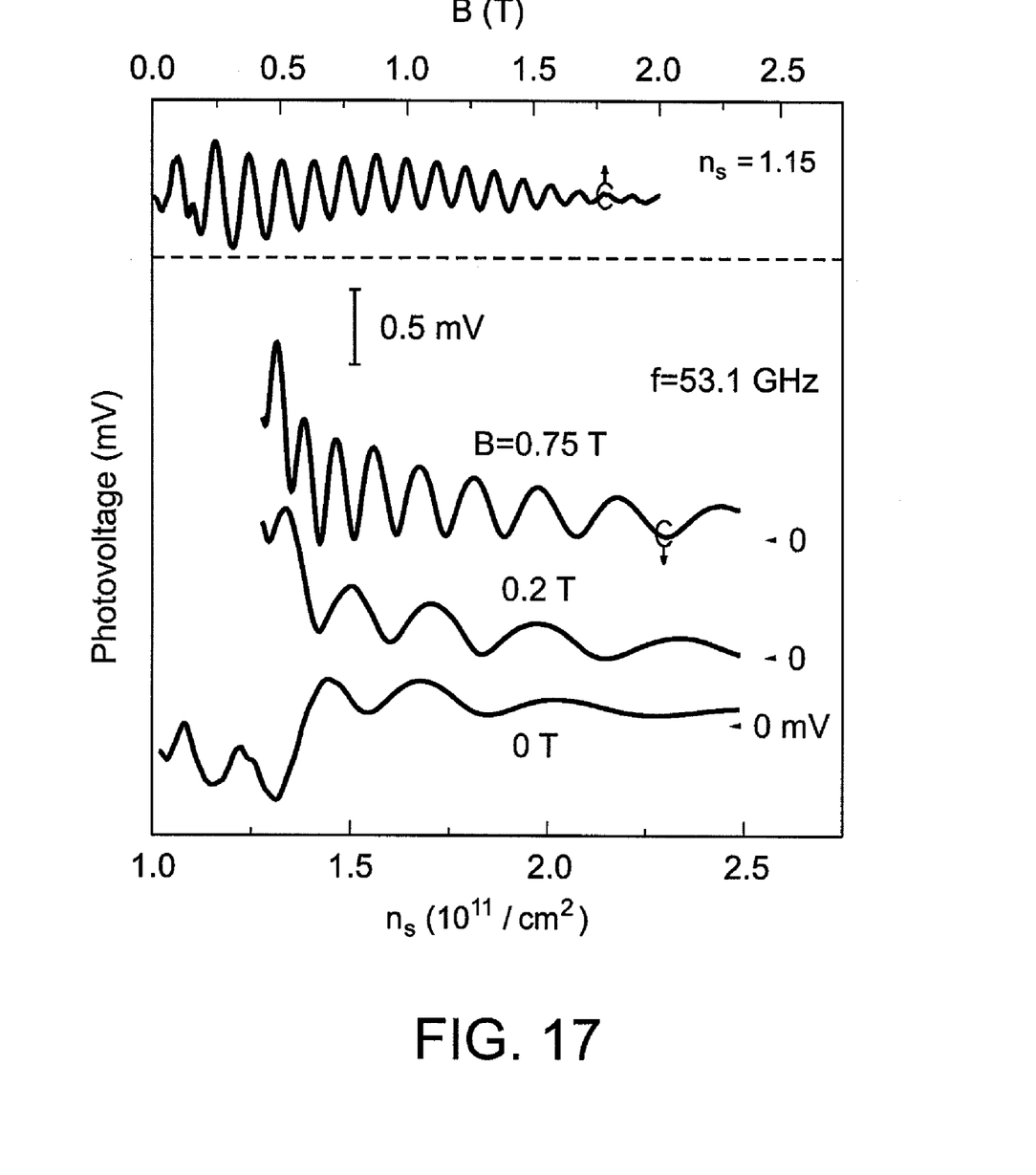
FIG. 17 (bottom part) shows experimentally measured dependencies of the radiation induced photovoltage, as a function of electron density, and for different magnitudes of magnetic field.

If an external magnetic field is introduced, equation (1) no longer describes the plasmon dispersion in the two-dimensional electron layer and certain changes in the photovoltage oscillations are bound to occur. FIG. 17 illustrates the oscillations observed in the presence of a magnetic field. The bottom part of FIG. 17 depicts the photovoltage device response is shown when the perpendicular component of the magnetic field is kept at a fixed level. Due to changes in the plasmon spectrum, the distance between oscillation maxima shrinks as the magnitude of the magnetic field increase. The top portion of FIG. 17 shows the operation of the device embodiment 1, in which the device tunability is implemented by means of sweeping the magnitude of the magnetic field. The photovoltage oscillations appear to be B—periodic, with a period inversely proportional to the radiation frequency.

Figure 18:
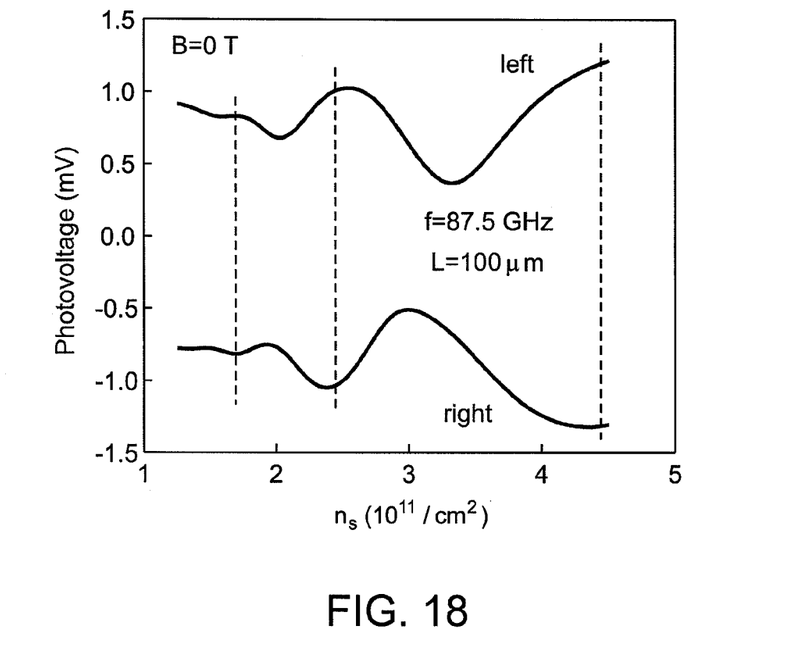
FIG. 18 demonstrates the radiation induced photovoltaic signal for an illustrative embodiments of the device of FIGS. 3 and 4.

FIG. 18 illustrates a device, in which two gate defects 15 and 16 (e.g. FIGS. 3, 4) are implemented on a single device 10, and the density of the central plasmonic cavity is tuned by top gate 11. The width of the plasmonic cavity equals to W=50 µm, and its length L=100 µm. The upper curve represents a device oscillatory response, when depleting voltage is applied to gate 13 and no voltage is applied to gate 14. The bottom curve represents the opposite case when depleting voltage is applied to gate 14 and no voltage is applied to gate 13. The oscillations reveal the spectrum of the monochromatic radiation of frequency 87.5 GHz incident on the device.

The device embodiment discussed with respect to FIG. 18 provides an opportunity to measure photo-response from a separate plasmonic cavity restricted by two easily-tuned defects 15 and 16, as opposed to a defect and non-tunable contact boundary. Due to the ability to adjust two independent parameters, the latter device implementation provides a better way to control the plasma waves propagating in the plasmonic cavity. Better controllability of the device is illustrated by the fact that the oscillations change their polarity when the working defect is altered.

Figure 19:
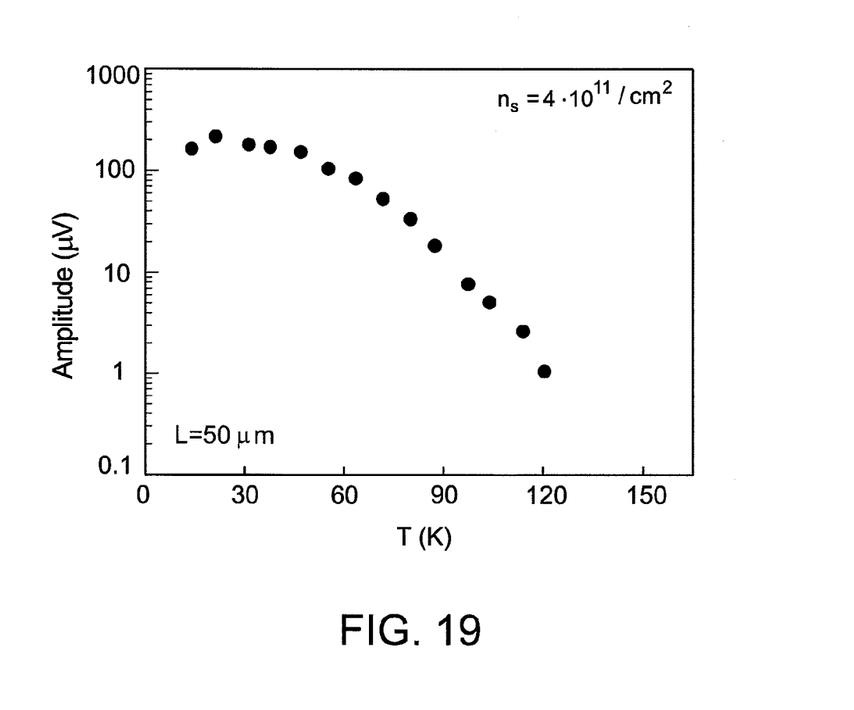
FIG. 19 is a graph of the spectrometer response vs temperature in degrees Kelvin (K), and illustrates the feasibility of the proposed method at temperatures above liquid nitrogen point.

The device temperature dependency of the spectrometer operation for a device embodiment 1 with plasmonic cavity size L=50 μm is presented in FIG. 19. The value plotted on the vertical axis represents an oscillation amplitude near $n_S=4\times10^{11}$ cm$^{-2}$ at B=0.5 T for the radiation frequency 90 GHz. The oscillation period does not depend on the temperature, and the amplitude only slightly decreases when the temperature increases from 4.2 K to 70 K. For a successful operation an apparatus can comprises a device for cooling said solid state structure. That can be accomplished in a number of ways. For example, by using nitrogen cooling system or Peltier refrigerator.

The experimental data above have been presented only illustrate the instant invention. It is not intended to be exhaustive or to restrict the scope of the invention to the disclosed examples and embodiments. While various aspects of the invention have been discussed in terms of an electromagnetic wave detection method, it should be understood that the disclosed findings, methods and discoveries may be utilized in other radiation-based technologies. These technologies may encompass generation, mixing, and/or frequency multiplication of radiation.

Thus, the foregoing description of various embodiments of the invention has been presented only for the purposes of illustration and description and not to limit the scope of the claimed invention. Therefore, it must be understood that many modifications and variations may be possible within the scope of the instant invention. Such modifications and variations that may be apparent to a person skilled in the art are intended to be included within the scope of the claims that follow.

What we claim is:

1. A spectrometer apparatus comprising:
    a solid state structure configured to receive incident electromagnetic radiation, said incident electromagnetic radiation characterized by a spectrum; where said structure having a tunable charge carrier layer characterized by a plurality of parameters;
    at least one plasmonic cavity in said tunable charge carrier layer;
    at least one defect in said tunable charge carrier layer;
    at least first and second contacts to said tunable charge carrier layer, said contacts being provided at said tunable charge carrier layer and spaced apart by a distance;
    a measuring device for measuring a response of said solid state structure to said incident electromagnetic radiation, where said response is measured between said first and second contacts and where said response provides information about said spectrum of said incident electromagnetic radiation; and
    a controllable tuning device for tuning of at least one of said plurality of parameters.

2. A method for measuring a spectrum of electromagnetic radiation, said method comprising the steps of:
    providing a solid state structure, said solid state structure having a tunable charge carrier layer, said charge carrier layer having at least one defect and at least one plasmonic cavity, where said charge carrier layer characterized by a plurality of parameters;
    receiving incident electromagnetic radiation characterized by a first frequency spectrum and energy;
    directing said incident electromagnetic radiation onto said solid state structure;
    transforming said energy of said incident electromagnetic radiation into energy of at least one plasma wave, said plasma wave characterized by an electromagnetic field and said plasma wave oscillating with a second frequency and propagating in at least one of said plasmonic cavities;
    generating a signal by using a non-linear response of at least one of said defects with respect to said plasmonic electromagnetic field;
    adjusting at least one of said parameters of said tunable charge carrier layer;
    taking a plurality of measurements of said signals at different values of at least one of said parameters;
    determining a relationship between at least one of said parameters and a value of said signal; and
    determining said first frequency spectrum of said incident electromagnetic radiation based on said relationship.

3. An apparatus in accordance with claim 1, wherein said response constitutes photovoltage.

4. An apparatus in accordance with claim 1, wherein said response constitutes photocurrent.

5. An apparatus in accordance with claim 1, wherein said response constitutes photocapacitance.

6. An apparatus in accordance with claim 1, wherein said response constitutes photo inductance.

7. An apparatus in accordance with claim 1, wherein said response constitutes photoresistance.

8. An apparatus in accordance with claim 1, wherein said tunable parameter is carrier density of said charge carrier layer.

9. An apparatus in accordance with claim 1, wherein said tunable parameter is dielectric environment of said charge carrier layer.

10. An apparatus in accordance with claim 1, wherein said tunable parameter is the strength of a magnetic field from an independent source, which field penetrates said charge carrier layer.

11. An apparatus in accordance with claim 1, wherein said tunable parameter is the effective carrier mass of said charge carrier layer.

12. An apparatus in accordance with claim 1, wherein said tunable parameter is the size of the plasmonic cavity.

13. An apparatus in accordance with claim 1, wherein said at least one defect is implemented as one of the following: an etched area, a charge carrier density inhomogeneity, a restriction or expansion, metallic layer (e.g., deposited on the structure), an impurity doping, a charge carrier mobility defect, a dielectric environment defect, a structural defect.

14. An apparatus in accordance with claim 1, wherein a plurality of periodically arranged in space tuned plasmonic cavities is introduced into said charge carrier layer.

15. An apparatus in accordance with claim 1, wherein a plurality of non-periodically arranged in space tuned plasmonic cavities is introduced in said charge carrier layer.

16. An apparatus in accordance with claim 1, wherein a plurality of additional contacts to said charge carrier layer is provided in addition to said first and second contacts.

17. An apparatus in accordance with claim 1, wherein more than one spectrometer is implemented in a single solid-state structure.

18. An apparatus in accordance with claim 1, wherein said solid state structure comprises a GaAs/AlGaAs heterostructure where Ga is gallium, As is arsenic, and Al is aluminum.

19. An apparatus in accordance with claim 1, wherein said solid state structure comprises one of a: Si MOSFET structure, an InAs structure, or a Si/Ge structure where Si is silicon, In is indium, As is arsenic, and Ge is germanium.

20. An apparatus in accordance with claim 1, wherein said charge carrier layer is realized in the form of a single quantum well.

21. An apparatus in accordance with claim 1, wherein said charge carrier layer is realized in the form of a double quantum well.

22. An apparatus in accordance with claim 1, wherein said charge carrier layer is realized in the form of a superlattice containing multiple quantum wells.

23. An apparatus in accordance with claim 1, wherein said charge carrier layer is realized in the form of a heterojunction.

24. An apparatus in accordance with claim 1 wherein charge carriers in said charge carrier layer are allowed to move in move in more than one dimension.

25. An apparatus in accordance with claim 1, wherein said incident radiation is directed onto said solid state structure by at least one of a lens, a horn and a waveguide.

26. An apparatus in accordance with claim 1, further comprising a device for cooling said solid state structure.

27. A method in accordance with claim 2, wherein at least one of said defects serves as both a boundary to said plasmonic cavity and as a rectifier.

28. A method in accordance with claim 2, wherein a rectification defect is located apart from said at least one plasmonic cavity.

29. A method in accordance with claim 2, wherein said signal is a photovoltage value.

30. A method in accordance with claim 2, wherein said signal is a photocurrent value.

31. A method in accordance with claim 2, wherein said signal is a photocapacitance value.

32. A method in accordance with claim 2, wherein said signal is a photoinductance value.

33. A method in accordance with claim 2, wherein said signal is a photoresistance value.

34. A method in accordance with claim 2, wherein said tunable parameter is carrier density of said charge carrier layer.

35. A method in accordance with claim 2, wherein said tunable parameter is dielectric environment of said charge carrier layer.

36. A method in accordance with claim 2, wherein said tunable parameter is the strength of a magnetic field from an independent source, which field penetrates said charge carrier layer.

37. A method in accordance with claim 2, wherein said tunable parameter is the effective carrier mass of said charge carrier layer.

38. A method in accordance with claim 2, wherein said tunable parameter is the size of the plasmonic cavity.

* * * * *